(12) United States Patent
Kokko

(10) Patent No.: US 6,442,509 B1
(45) Date of Patent: Aug. 27, 2002

(54) PROCEDURE FOR VERIFYING THE DURATION OF A PROCESS IN A TELECOMMUNICATION SYSTEM BASED ON PROCESSOR OPERATION

(75) Inventor: Teemu Kokko, Äänekoski (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/670,066

(22) Filed: Sep. 26, 2000

Related U.S. Application Data

(63) Continuation of application No. PCT/FI99/00220, filed on Mar. 22, 1999.

(30) Foreign Application Priority Data

Mar. 27, 1998 (FI) .................................................. 980701

(51) Int. Cl.$^7$ ............................................. G06F 15/02
(52) U.S. Cl. ...................... 702/187; 702/178; 377/15
(58) Field of Search ................................ 702/187, 178; 377/15, 44, 20; 368/10, 156, 28, 73; 379/58, 59

(56) References Cited

U.S. PATENT DOCUMENTS 4,356,352 A * 10/1982 Hilliges .................. 179/7.1 R
5,487,096 A    1/1996 Pearson et al. ................ 377/15
6,134,187 A * 10/2000 Tomiyasu ..................... 368/28

FOREIGN PATENT DOCUMENTS

| DE | 25 58 368 | 7/1977 |
| EP | 0 113693 | 7/1984 |
| JP | 7175688 | 7/1995 |

* cited by examiner

Primary Examiner—Kamini Shah
(74) Attorney, Agent, or Firm—Altera Law Group, LLC

(57) ABSTRACT

The invention concerns a procedure and system for verification of the duration of a process started in a telecommunication system. The duration of the process is based on processor operation at a given instant defined according to the internal calendar time of the system. The duration of the process is measured as the time interval between the start and end instants according to the calendar time of the operating system. The duration of the process is also measured by a timer independent of calendar time, and the measurement of the duration of the process is verified by comparing the duration determined by calendar time with the duration determined by the timer independent of calendar time.

6 Claims, 2 Drawing Sheets

Figure 1:
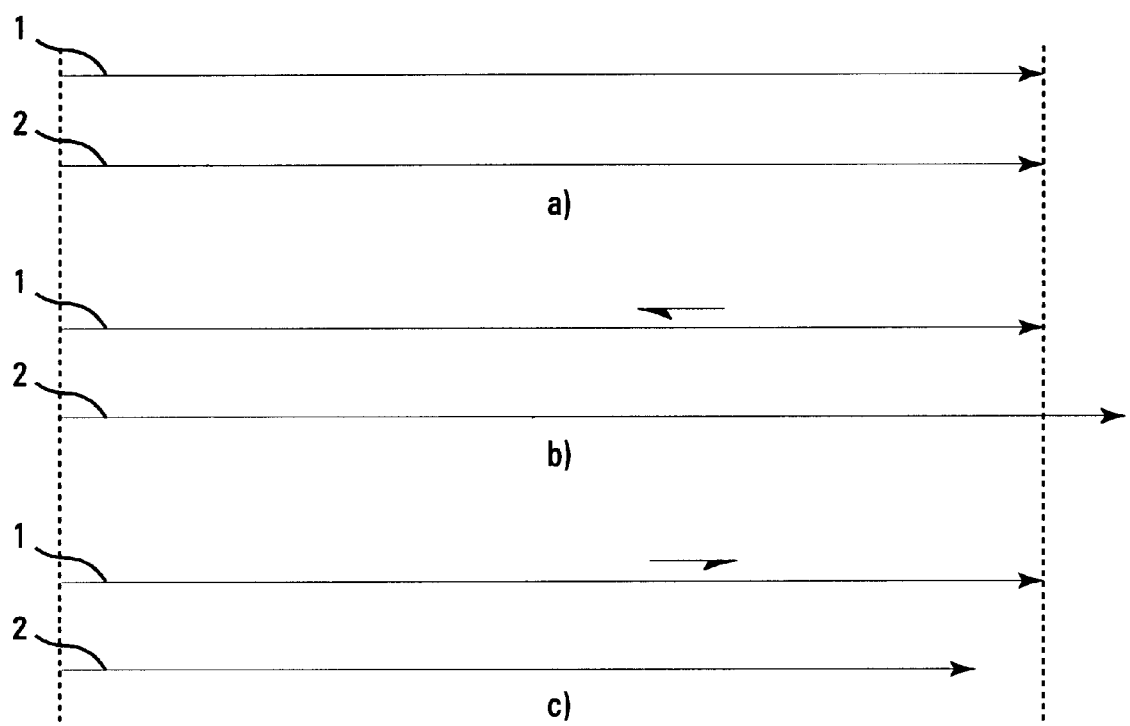

PROCEDURE FOR VERIFYING THE DURATION OF A PROCESS IN A TELECOMMUNICATION SYSTEM BASED ON PROCESSOR OPERATION

This application is a continuation of PCT/FI99/00220 filed Mar. 22, 1999.

The present invention relates to a procedure as defined in the preamble of claim 1 and to a system as defined in the preamble of claim 4 for verifying the duration of a process in a telecommunication system based on processor operation.

Processor operated systems, such as computer systems, often use a time measuring method based on time of day and date, which is called calendar time. Calendar time may be based e.g. on the standardised UTC time (UTC, Universal Time Coordinated). The internal clock of a system often has small deviations from the standard time because the clocks run at different speeds. The UTC time also often contains leaps, leap seconds for synchronising the clock with the rotation of the earth. Therefore, the calendar time must be checked from time to time and changed if necessary. The problem with this method are time-dependent processes which occur during a shift of calendar time and whose start and end instants are bound to the calendar time. After the calendar time shift, the actual duration of the process is not known.

The object of the present invention is to eliminate the drawbacks described above. A specific object of the present invention is to disclose a procedure that makes it possible to bring time-dependent processes bound to calendar time under control.

As for the features characteristic of the invention, reference is made to the claims.

The procedure of the invention concerns the verification of the duration of a process started in a telecommunication system based on processor operation at a given instant defined according to the internal calendar time of the system. According to the invention, the duration of the process is measured by two methods; firstly, as the time interval between the start and end instants according to the calendar time of the operating system; secondly, by using a timeout independent of the calendar time. The measurement of the duration of the process is verified by comparing the duration as determined by calendar time with the duration as determined by the timeout independent of calendar time.

In a preferred embodiment of the invention, the measurement result is corrected by a factor obtained from the ratio between the calendar time duration and the calendar-time independent timeout.

In a preferred embodiment of the invention, the process to be measured is a metering process used to measure e.g. the duration of a call or data connection.

The system of the invention relates to the verification of the duration of a process started in a telecommunication system based on processor operation at a given instant defined according to the internal calendar time of the system. According to the invention, the system comprises means for measuring the duration of the process as the time interval between the start and end instants according to the calendar time of the operating system, means for measuring the duration of the process by using a timeout independent of the calendar time, and means for verifying the duration of the process by comparing the duration determined according to calendar time with the duration determined by a timeout independent of calendar time.

In a preferred embodiment of the invention, the system comprises means for correcting the measurement result by using a coefficient obtained from the ratio between the duration according to calendar time and the timeout independent of calendar time. In a preferred case, the invention is used to verify the duration of a metering process.

The invention has the advantage that it makes it possible to estimate the utility value of a process. It provides means for detecting whether the process has lasted for a given time or whether it is necessary to take additional measures regarding the matter to correct the situation. The invention is especially applicable in situations where a process is to occur at a certain time, both in respect of its starting instant and duration. Therefore, it is important to know the length of time used for the process, regardless of possible changes in the calendar time of the system during the process.

Figure 2:
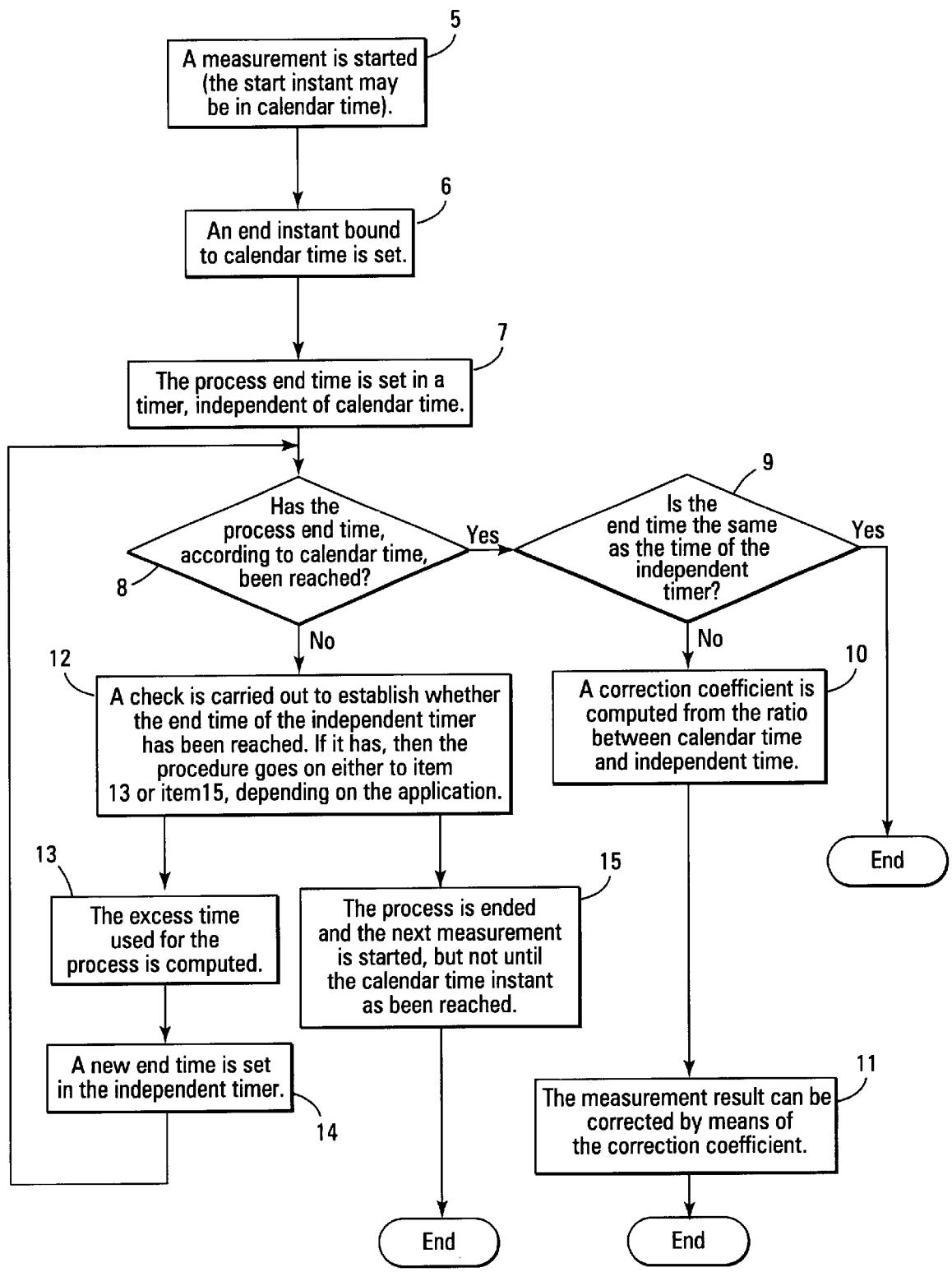

In the following, the invention will be described by the aid of a few examples of its embodiments, with reference to the attached drawing, wherein FIG. 1 presents a diagrammatic example according to the invention, and FIG. 2 presents diagrammatic functional representation according to the invention.

FIG. 1 shows two time vectors associated with the measurement of a process. Vector 2 represents the measurement of process duration based on a separate timer independent of calendar time, and vector 1, based on calendar time.

Case a) represents a normal situation with no shift in calendar time. Both measuring methods give the same result, the start and end instants are the same according to the calendar time and according to the timer. The measurement result is acceptable.

In case b), the calendar time is shifted backward. The process duration 1 calculated from the process start and end instants by calendar time is shorter than the actual process duration 2 measured by a timer. In case c), the calendar time is shifted forward, and duration 1 is correspondingly longer than duration 2. On the basis of the deviation detected, the output produced by the process can be corrected. For instance, in measuring call frequency for a given time interval, the correct final result is obtained by using a coefficient calculated from the ratio between durations 1 and 2.

FIG. 2 presents a flow diagram representing an embodiment of the procedure of the invention. In the following, the flow diagram will be explained with reference to the box numbers.

5—A process, e.g. a measurement, is started. The start instant may be a given instant in calendar time.

6—An end instant bound to calendar time is set, e.g. an excitation request at which the process must end.

7—The process end time is set in a timer independent of calendar time.

8—A check is carried out to establish whether the process end time according to calendar time has been reached. If it has, then the procedure goes on to item 9, otherwise to item 12.

9—A check is carried out to establish whether the end time is the same as the time of the independent timer, within the limits of the tolerances of measuring delays. If it is, the process duration was correct and the routine is ended, otherwise the procedure goes on to item 10.

10—A correction coefficient is computed from the ratio between calendar time and independent time.

11—The measurement result can be corrected by means of the correction coefficient, whereupon the routine is ended.

12—A check is carried out to establish whether the end time of the independent timer has been reached. If it has, then the procedure goes on either to item 13 or item 15, depending on the application.

13—The excess time used for the process is computed.

14—A new end time is set in the independent timer.

15—The process is ended and the next measurement is started, but not until the calendar time instant has been reached. Exit routine.

The application must take into account the priorities of the two different time measuring methods. The priority may the same for both methods or it may be different for each. If the calendar time is shifted forward during the process, then the procedure will jump directly to item 9. Even if the calendar time should have been shifted beyond the instant set as the end instant, it is still possible to determine the correct duration of the process. The duration of the next process can be defined as being shorter by a margin corresponding to the excess time of the previous process. If the calendar time is shifted backward during the process, then the procedure will jump to item 12 when the time set in the timer independent of calendar time is reached. In this case, the excess time the measurement will take is computed by subtracting the current calendar time from the set end time. The excess time is summed in a variable, from which it can be read later at item 10. At the same time, based on the excess time, a new end time is set in the timer independent of calendar time. Disturbances caused by multiple calendar time shifts are thus eliminated.

In an embodiment of the invention, the procedure is applied in conjunction with a telephone exchange, especially in various metering situations.

The invention is not restricted to the examples of its embodiments described above, but many variations are possible within the scope of the inventive idea defined in the claims.

What is claimed is:

1. Procedure for verification of the duration of a process started in a telecommunication system based on processor operation at a given instant defined according to internal calendar time of the system, comprising:

measuring the duration of the process as the time interval between the start and end instants according to the calendar time of the operating system, measuring the duration of the process by means of a timer independent of calendar time, and verifying the measurement of the duration of the process by comparing the duration determined by calendar time with the duration determined by the timer independent of calendar time.

2. Procedure as defined in claim 1, wherein the measurement result is corrected by means of a coefficient obtained from the ratio between the calendar time duration and the timer independent of calendar time.

3. Procedure as defined in claim 1, wherein the process is a metering process.

4. System for verification of the duration of a process started in a telecommunication system based on processor operation at a given instant defined according to internal calendar time of the system, wherein the system comprises:

means for measuring the duration of the process as the time interval between the start and end instants according to the calendar time of the operating system, means for measuring the duration of the process by using a timer independent of calendar time, and means for verifying the measurement of the duration of the process by comparing the duration determined by calendar time with the duration determined by the timer independent of calendar time.

5. System as defined in claim 4, wherein the system comprises means for correcting the measurement result by using a coefficient obtained from the ratio between the calendar time duration and the timer independent of calendar time.

6. System as defined in claim 4, wherein the process in the system is a metering process.

* * * * *